US010640054B2

(12) United States Patent
Fischer et al.

(10) Patent No.: US 10,640,054 B2
(45) Date of Patent: May 5, 2020

(54) STOWABLE COMPUTER WORKSTATION

(71) Applicant: The Boeing Company, Chicago, IL (US)

(72) Inventors: Brian Gregory Fischer, Bothell, WA (US); Frank Henry Dugger, Auburn, WA (US); Bryant Scott Owen, San Tan Valley, AZ (US); Alan J. Wong, Issaquah, WA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 15/954,592

(22) Filed: Apr. 16, 2018

(65) Prior Publication Data

US 2019/0061639 A1     Feb. 28, 2019

Related U.S. Application Data

(63) Continuation of application No. 14/317,312, filed on Jun. 27, 2014, now Pat. No. 9,944,235.

(60) Provisional application No. 61/905,190, filed on Nov. 16, 2013.

(51) Int. Cl.
*B64D 11/00* (2006.01)
*F16M 11/02* (2006.01)
(Continued)

(52) U.S. Cl.
CPC .... *B60R 11/0252* (2013.01); *B64D 11/00153* (2014.12); *F16M 11/02* (2013.01);
(Continued)

(58) Field of Classification Search
CPC .... F16M 11/02; F16M 11/10; B60R 11/0252; B60R 2011/0019; B60R 2011/0082;
(Continued)

(56) References Cited

U.S. PATENT DOCUMENTS 4,880,270 A * 11/1989 Cooper ................. A47B 21/03
297/188.21
5,177,616 A * 1/1993 Riday ................. B64D 11/0015
248/917

(Continued)

FOREIGN PATENT DOCUMENTS

EP     2028580 B1    4/2010
JP     07309179 A    11/1995
(Continued)

OTHER PUBLICATIONS

Russian Office Action for application No. 2014145953 dated Jun. 7, 2018, 32 pgs.
(Continued)

*Primary Examiner* — Tan Le
(74) *Attorney, Agent, or Firm* — Moore Intellectual Property Law, PLLC

(57) ABSTRACT

A stowable computer workstation ("SCW") for a workplace within a vehicle is described, where the workplace has an inner sidewall of the vehicle. The SCW may include a video display mount assembly and a deployment support attached to the video display mount assembly. The deployment support is configured to deploy and stow the video display mount assembly against the inner sidewall and the deployment support is secured to the inner sidewall.

21 Claims, 11 Drawing Sheets

(51) Int. Cl.
  *A47B 39/00* (2006.01)
  *F16M 11/10* (2006.01)
  *B60K 35/00* (2006.01)
  *B60R 11/00* (2006.01)
  *B60R 11/02* (2006.01)

(52) U.S. Cl.
  CPC ....... *B60K 35/00* (2013.01); *B60R 2011/0019* (2013.01); *B60R 2011/0082* (2013.01); *B60R 2011/0084* (2013.01); *B60R 2011/0087* (2013.01); *F16M 11/10* (2013.01)

(58) Field of Classification Search
  CPC .... B60R 2011/0084; B60R 2011/0087; B64D 11/00; B64D 11/00153; B60K 35/00; B23Q 1/0045
  USPC ............ 248/917, 287.1, 289.11; 361/679.01, 361/679.04, 679.05, 681; 297/130, 135, 297/170, 188.14, 188.21, 411.2; 348/827, 348/739, 825, 836, 837
  See application file for complete search history.

(56) References Cited

U.S. PATENT DOCUMENTS

| | | | |
|---|---|---|---|
| 5,751,548 A | 5/1998 | Hall et al. | |
| 7,121,514 B2 | 10/2006 | Twyford | |
| 7,852,622 B2 * | 12/2010 | Ferren | B60K 35/00 361/679.05 |
| 7,995,331 B2 * | 8/2011 | Seitz | B23Q 1/0045 248/278.1 |
| 9,944,235 B2 * | 4/2018 | Fischer | B60R 11/0252 |
| 2001/0042812 A1 | 11/2001 | Perzewski | |
| 2005/0040299 A1 | 2/2005 | Twyford | |
| 2005/0163558 A1 | 7/2005 | Lee | |
| 2009/0050781 A1 | 2/2009 | Seitz et al. | |
| 2009/0161302 A1 | 6/2009 | Ferren et al. | |
| 2010/0201165 A1 * | 8/2010 | Dankovich | A47B 83/001 297/135 |
| 2012/0193488 A1 | 8/2012 | Chung et al. | |

FOREIGN PATENT DOCUMENTS

| | | |
|---|---|---|
| WO | 1998049414 A1 | 11/1998 |
| WO | 2010004672 A1 | 1/2010 |
| WO | 2012129116 A2 | 9/2012 |

OTHER PUBLICATIONS

Canadian Intellectual Property Office Action dated Jan. 18, 2016, issued in corresponding parent CA Application No. 2,871,051, 4 pgs.

European Search Report dated Mar. 18, 2015, issued in parent corresponding EP Application No. 14193275.6, 7 pgs.

* cited by examiner

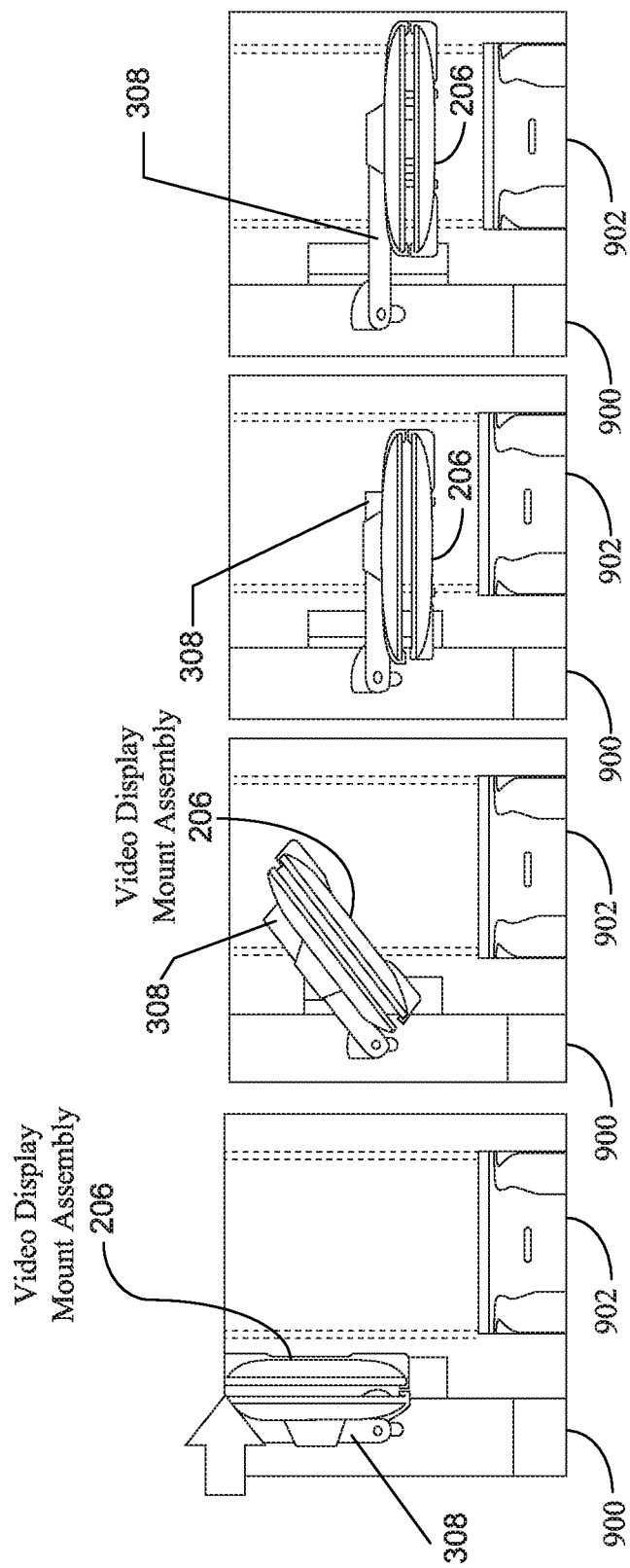

STOWABLE COMPUTER WORKSTATION

CROSS-REFERENCE TO RELATED APPLICATION

This application claims priority to and is a continuation of U.S. Utility patent application Ser. No. 14/317,312, entitled "Stowable Computer Workstation," filed on Jun. 27, 2014, to inventors Brian G. Fischer et al., which issued as U.S. Pat. No. 9,944,235 on Apr. 17, 2018, which application claims priority to U.S. Provisional Patent Application Ser. No. 61/905,190, entitled "Stowable Computer Workstation," filed on Nov. 16, 2013, to inventors Brian G. Fischer et al., both of which applications are incorporated herein by this reference in their entireties.

BACKGROUND OF THE INVENTION

1. Field of the Invention

The present invention relates generally to deployment systems of displays in a vehicle, and more particularly, to deployment systems of displays near a seat in a vehicle.

2. Related Art

The use of air travel has greatly increased in recent decades to the point that it is today a common form of transportation. Additionally, mobile computing and communications have advanced to the point that many air travel passengers typically carry their mobile computers (such as, for example, laptop, notebook, or tablet computers) onboard the aircraft in order to do work, communicate, or for personal entertainment purposes.

Unfortunately, at present the conditions for using mobile computers onboard a typical commercial aircraft are less than ideal because the space in the cabin of a typical commercial aircraft is cramped, the typical spacing between passenger seats (especially in the non-first or business class areas) is such that generally passengers will only be able to use mobile computers that have small video displays, and generally keyboards and other input devices are difficult to manage. As such, there is a need for a system and method to overcome these problems.

SUMMARY

A stowable computer workstation ("SCW") for a workplace within a vehicle is described, where the workplace has an inner sidewall of the vehicle. The SCW may include a video display mount assembly and a deployment support attached to the video display mount assembly. The deployment support is configured to deploy and stow the video display mount assembly against the inner sidewall and the deployment support is secured to the inner sidewall.

Alternatively, the SCW may also include a deployment arm rotatable between a stowed position and a deployed position, a trolley configured to slide along a length of the deployment arm, a video display mounting fixture attached to the trolley, and a deployment mechanism. The deployment mechanism is configured to allow coupled translation of the trolley along the deployment arm while rotating the deployment arm and the deployment mechanism is coupled to the deployment arm. In this configuration, the video display mounting fixture is translated along the deployment arm as the deployment arm is rotated between the stowed and deployed positions.

Also described is a workplace within a vehicle having an inner sidewall. The workplace may, include a seat adjacent to the inner sidewall, a video display mount assembly, and a deployment support for deploying the video display mount assembly in front of the seat. The video display mount assembly includes a first video display and a second video display. The first video display and the second video display may be attached together in a clamshell configuration and the deployment support may be mounted next to the seat.

In an example of operation, the SCW is configured to rotate the deployment arm from the inner sidewall and slide the trolley along the deployment arm until the deployment arm is approximately normal to the inner sidewall. The SCW is also configured to open the video display mount assembly in a rotational direction that is in an approximately normal direction to the deployment arm.

Other devices, apparatus, systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The invention may be better understood by referring to the following figures. The components in the figures are not necessarily to scale, emphasis instead being placed upon illustrating the principles of the invention. In the figures, like reference numerals designate corresponding parts throughout the different views.

FIGS. 9A-9D are illustrations of a video display mount assembly during various phases of the method described in FIG. 8.

DETAILED DESCRIPTION

A stowable computer workstation ("SCW") for a workplace within a vehicle is described, where the workplace has an inner sidewall of the vehicle. The SCW may include a video display mount assembly and a deployment support attached to the video display mount assembly. The deployment support is configured to deploy and stow the video display mount assembly against the inner sidewall and the deployment support is secured to the inner sidewall.

Alternatively, the SCW may also include a deployment arm rotatable between a stowed position and a deployed position, a trolley configured to slide along a length of the deployment arm, a video display mounting fixture attached to the trolley, and a deployment mechanism. The deployment mechanism is configured to allow coupled translation of the trolley along the deployment arm while rotating the deployment arm and the deployment mechanism is coupled to the deployment arm. In this configuration, the video display mounting fixture is translated along the deployment arm as the deployment arm is rotated between the stowed and deployed positions.

Also described is a workplace within a vehicle having an inner sidewall. The workplace may include a seat adjacent to the inner sidewall, a video display mount assembly, and a deployment support for deploying the video display mount assembly in front of the seat. The video display mount assembly includes a first video display and a second video display. The first video display and the second video display may be attached together in a clamshell configuration and the deployment support may be mounted next to the seat.

In an example of operation, the SCW is configured to rotate the deployment arm from the inner sidewall and slide the trolley along the deployment arm until the deployment arm is approximately normal to the inner sidewall. The SCW is also configured to open the video display mount assembly in a rotational direction that is in an approximately normal direction to the deployment arm.

Figure 1:
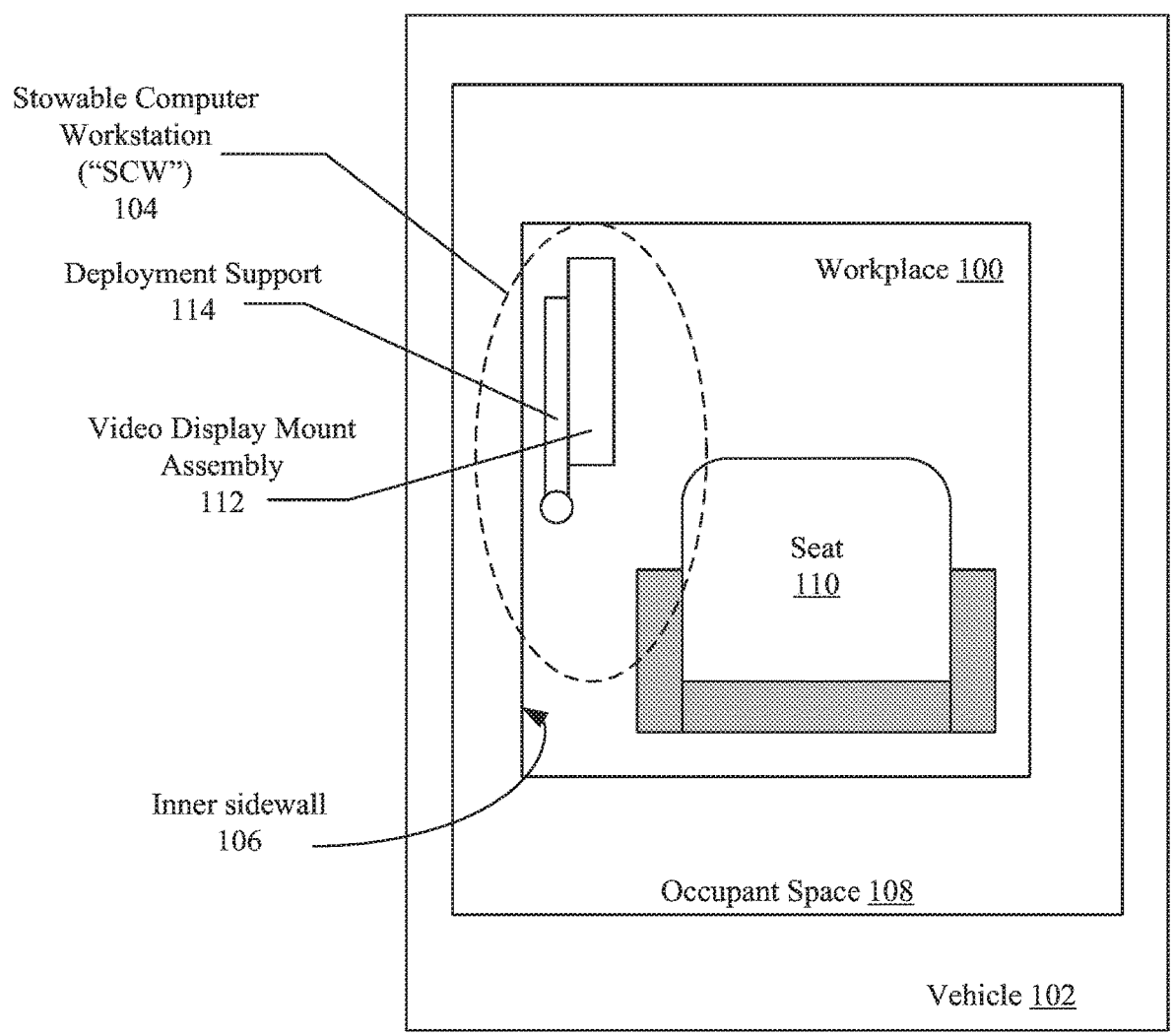
FIG. 1 is a block diagram of an example of an implementation of a workplace within a vehicle including a stowable computer workstation ("SCW") in accordance with an embodiment of the present invention.

Turning to FIG. 1, a block diagram of an example of an implementation of a workplace 100 within a vehicle 102 including a SCW 104 is shown in accordance with an embodiment of the present invention. The SCW 104 may be stowed against an inner sidewall 106 of the vehicle 102. The workspace 100 is defined as a sub-space of an occupant space 108, within the vehicle 102, extending from the inner sidewall 106. In this example, the vehicle 102 may be any type of passenger carrying vehicle such as, for example without limitation, an aircraft, spacecraft, bus, automobile, recreational vehicle, train, or watercraft.

In general, the occupant space 108 is configured to accommodate at least one person based on the type of vehicle 102. As an example, if the vehicle 102 is a commercial aircraft, the occupant space 108 is configured to include multiple passengers, flight attendants, flight crew, and galleys. If, instead, the vehicle 102 is a bus, the occupant space 108 of the bus is configured to accommodate a driver and multiple passengers. Moreover, if the vehicle 102 is an automobile, the occupant space 108 of the automobile is configured to accommodate a driver and optionally one or more passengers.

In this example in FIG. 1, the workplace 100 is within the occupant space 108. The workplace 100 includes at least one seat 110, which is adjacent to the inner sidewall 106, and the SCW 104. The SCW 104 includes a video display mount assembly 112 and a deployment support 114 attached to the video display mount assembly 112. The deployment support 114 may be mounted to the inside (for example, to the inner sidewall 106, floor, ceiling, or ledge of the inner sidewall 106) of the vehicle 102, adjacent to and slightly in front of the seat 110 so as to allow proper deployment of the SCW 104. In an example of operation, the deployment support 114 moves the video display mount assembly 112 between a stowed position (also referred to as a "closed" position) and a deployed position (also referred to as an "open" position). When the SCW 104 is in the deployed position, the video display mount assembly 112 is in front of the seat 110. Alternatively, when the SCW 104 is in the stowed position, the video display mount assembly 112 may be against the inner sidewall 106 within the workplace 100.

As an example, the video display mount assembly 112 may be a hinged clamp structure and/or mechanism that is similar in appearance to a clamshell (generally referred to as a "clamshell configuration") that is configured to hold at least one video display and an optional input device or flat plate. The video display may be a flat panel video display that includes a display screen. The display screen may be optionally a touch screen that may act as an input device. As an example of implementation, two video displays in clamshell configuration may be connected to the video display mount assembly 112. Alternatively, in another example, one video display and an input device (such as, for example, a combination of keyboard and pointing input device) may be connected to the video display mount assembly 112. Moreover, in another example, only one video display may be connected to the video display mount assembly 112 in combination with an empty flat plate. The empty flat plate may be utilized by a passenger to place and hold his/her mobile computer.

As an example of operation, a video display attached to the video display mount assembly 112 may communicate with a computer (not shown) that may belong to the passenger (i.e., a mobile computer) or to an owner, licensor, operator, or other third party related to the vehicle 102. In the case of a non-passenger provided computer, the computer may be integrated with the video display attached to the video display mount assembly 112, or it may be remote from the video display. If remote, the computer may be either located next to the seat 110, above or below the seat 110, or at a remote location within the vehicle. The remote computer may be in signal communication with the video display via one or more signal paths that may include wired and/or wireless signal paths. In the case of a passenger provided mobile computer, the video display attached to the video display mount assembly 112 may be placed in signal communication with the mobile computer of the passenger via a signal path that is compatible with the mobile computer of the passenger such as, for example, USB, VGA, DVI, HDMI, RGB, Bluetooth®, Wi-Fi®, etc.

It is appreciated by those skilled in the art that the circuits, components, modules, and/or devices of, or associated with, the SCW are described as being in signal communication with each other, where signal communication refers to any type of communication and/or connection between the circuits, components, modules, and/or devices that allows a circuit, component, module, and/or device to pass and/or receive signals and/or information from another circuit, component, module, and/or device. The communication and/or connection may be along any signal path between the circuits, components, modules, and/or devices that allows signals and/or information to pass from one circuit, component, module, and/or device to another and includes wireless or wired signal paths. The signal paths may be physical, such as, for example, conductive wires, electromagnetic wave guides, cables, attached and/or electromagnetic or mechanically attached terminals, semi-conductive or dielectric materials or devices, or other similar physical connections or couplings. Additionally, signal paths may be non-physical such as free-space (in the case of electromagnetic propagation) or information paths through digital components where communication information is passed from one circuit, component, module, and/or device to another in varying digital formats without passing through a direct electromagnetic connection.

Figure 2:
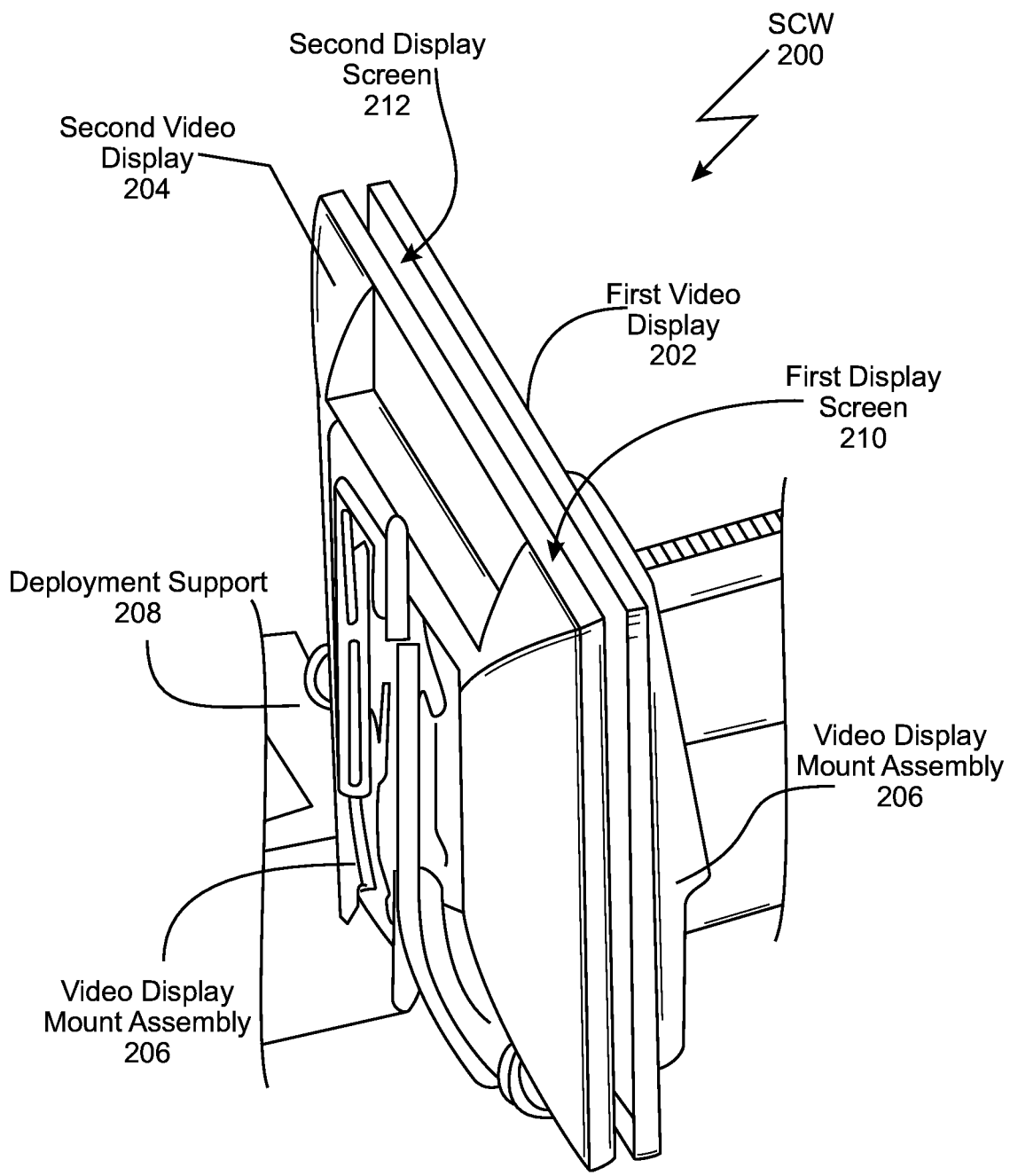
FIG. 2 is a front prospective view of an example of an implementation of the SCW including two video displays attached to the SCW in a closed position in accordance with an embodiment of the present invention.

In FIG. 2, a front prospective view of an example of an implementation of the SCW 200 including two video displays (first video display 202 and second video display 204) attached to the SCW 200 in a closed position, is shown in accordance with an embodiment of the present invention. The SCW 200 includes the video display mount assembly 206 that is attached to the first and second video displays 202 and 204. The deployment support 208 is attached to the video display mount assembly 206.

In this example, the video display mount assembly 206 includes a hinged clamp structure and/or mechanism that has a clamshell configuration. The video display mount assembly 206 is configured to couple both the first video display 202 and the second video display 204 in a clamshell configuration. In this example, each video display 202 and/or 204 may be a flat panel video display that includes a display screen (i.e., a first display screen 210 for first video display 202 and a second display screen 212 for second video display 204). Each display screen 210 and/or 212 may be optionally a touch screen that may act as an input device.

In FIG. 2, the video display mount assembly 206 is shown in a clamshell configuration that is in a closed position, such that the video display mount assembly 206 is configured to position the first video display 202 and the second video display 204 in an adjacent face-to-face position where the face of the first display screen 210 is adjacent to and faces the face of the second display screen 212. In this face-to-face closed position, the first display screen 210 and the second display screen 212 are protected against potential damage to the first video display 202, second video display 204, and video display mount assembly 206. It is appreciated that even if some damage were to occur to one, or both, of the display screens 210 and 212, this damage (such as, for example, fragments from a broken display screen) will be contained within the video display mount assembly 206.

Figure 3:
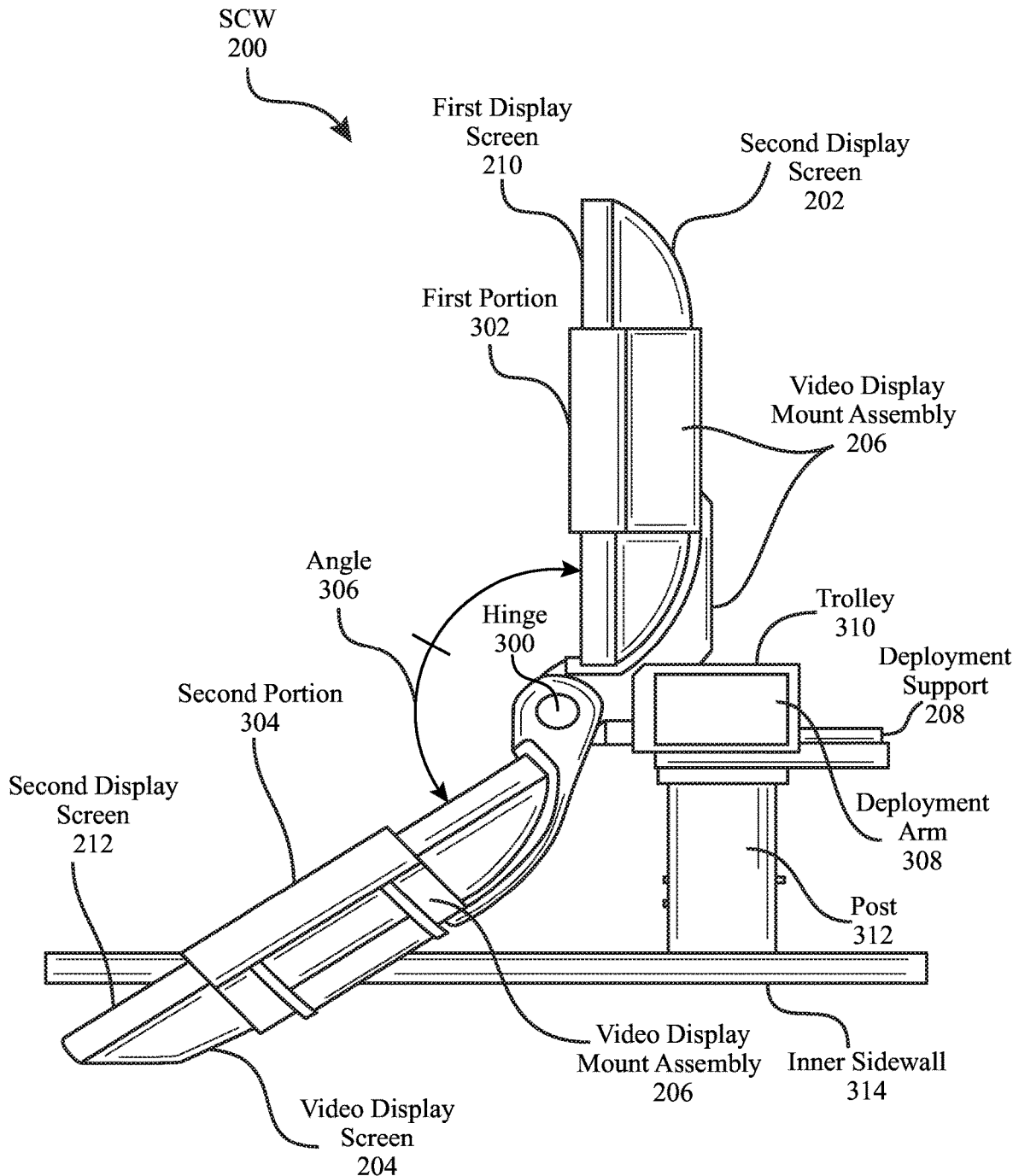
FIG. 3 is a side view of the SCW with the two attached video displays, shown in FIG. 2, where the SCW is in an open position in accordance with an embodiment of the present invention.

In FIG. 3, a side view of the SCW 200 with the two attached video displays 202 and 204 (shown in FIG. 2) is shown, where the SCW 200 is in an open position in accordance with an embodiment of the present invention. In this view, a hinge 300 is shown coupling a first portion 302 of the video display mount assembly 206 to a second portion 304 of the video display mount assembly 206. Specifically, the first portion 302 of the video display mount assembly 206 is attached to the first video display 202 and the second portion 304 of the video display mount assembly 206 is attached to the second video display 204. The hinge 300 is configured to allow the video display mount assembly 206 to move between the closed and open positions.

In an example of operation, the video display mount assembly 206 may be placed in the open position when it is deployed in front of a seat. In the open position, the video display mount assembly 206 may be fully opened such that the first video display 204 is relatively upright and the second video display 204 may be angled 306 downward from the first video display 204 towards the seat (not shown). Specifically, in this open position, the video display mount assembly 206 is configured to position the first display screen 210 in an approximately vertical position and the second display screen 212 at a downward angle 306 position where the downward angle 306 position of the second display screen 212 is at an obtuse angle from the approximate vertical position of the first display screen 210.

In the open position, the position of the video display mount assembly 206 and/or the seat (not shown) may be adjusted to better suit the needs of the passenger (not shown) sitting in the seat (not shown). Additionally, if the second video display 204 includes a second display screen 212 that is a touch screen, the second video display 204 may be utilized as an input device by the passenger (not shown). Similarly, if instead of the second video display, an input device such as a keyboard (not shown) and pointing device (not shown) is attached to the second portion 304 of the video display mount assembly 304, the passenger (not shown) may utilize the keyboard (not shown) and pointing device (not shown) to interface with the computer in signal communication with the first video display 202. Moreover, instead of the second video display or input device, a flat tray (also known as a shelf) may be attached to the second portion 304 of the video display mount assembly 304, where the flat tray may be utilized as a writing surface of shelf for a personal computer. In these examples, the position of the video display mount assembly 206 and/or seat may be adjusted so that the second video display 204, or the combination of keyboard (not shown) and pointing device (not shown), is a convenient position for use as an input device by the passenger (not shown).

In this example, a deployment support 208 is shown attached to the video display mount assembly 206 via deployment arm 308 of the deployment support 208 and a trolley 310 of the video display mount assembly 206. The deployment arm 308 is attached to a post 312 that is attached to the inner sidewall 314 (which may be a ledge). The post 312 acts as a pivot point for the deployment arm 308. The trolley 310 is the structural housing that supports the display fixtures (i.e., video display mount assembly 206) and slides along the deployment arm 308.

It is appreciated by those of ordinary skill in the art, that while the first and second video displays 202 and 204 are shown, in FIGS. 2 and 3, to be attached to the video display mount assembly 206 in a clamshell configuration that is vertical (i.e., the video display mount assembly 206 opens in a way that places the first video display 202 above the second video display 204), the first and second video displays 202 and 204 may alternatively be configured in a clamshell configuration that is horizontal. In a horizontal clamshell configuration, the first and second video displays 202 and 204 are attached to the video display mount assembly 206 in way that allows for the for the first and second video displays 202 and 204 to be hinged side-by-side. In this alternative example, the horizontal clamshell configuration allows the first and second video displays 202 and 204 to open into side-by-side video displays in the open position.

It is also appreciated that while the first and second video displays 202 and 204 are shown, in FIGS. 3 and 3, to be of approximately the same size, this is for the convenience of illustration purposes and as such, the first and second video displays 202 and 204 may be optionally of both equal and unequal sizes.

Figure 4:
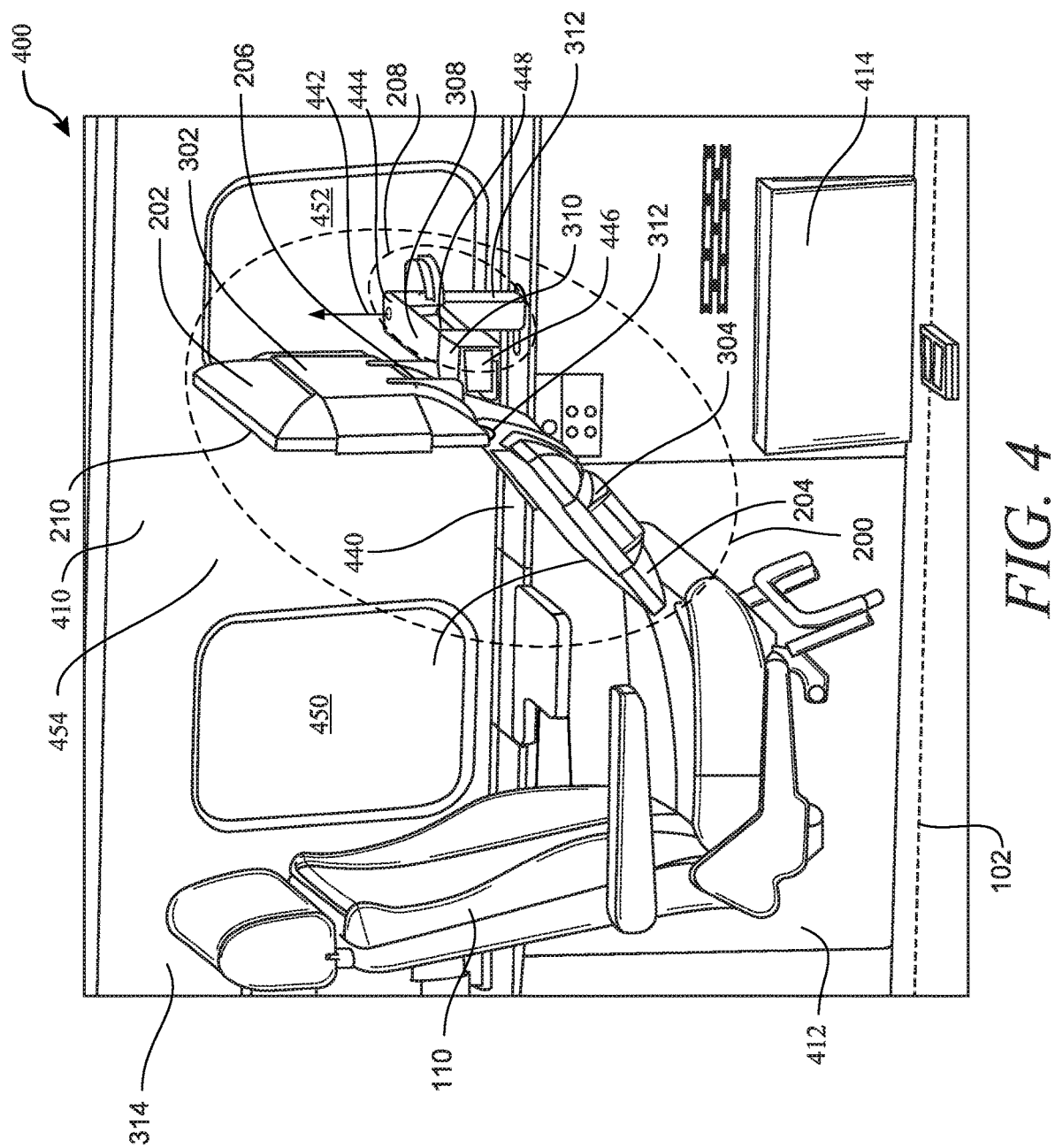
FIG. 4 is side prospective view of an example of an implementation of a workplace within a vehicle including the SCW, shown in FIGS. 2 and 3, in accordance with an embodiment of the present invention.

Turning to FIG. 4, a side prospective view of an example of an implementation of a workplace 400 within a vehicle 102 including the SCW 200 (shown in FIGS. 2 and 3) is shown in accordance with an embodiment of the present invention. The vehicle 102 may be, for example, an aircraft, train, watercraft, bus, spacecraft, etc. In this example, the workplace 400 may include the SCW 200, a seat 106, and an inner sidewall 314. The inner sidewall 314 may include an upper inner sidewall 410 and a lower inner sidewall 412. The lower inner sidewall 412 may include a computer storage compartment 414. The computer storage compartment 414 may be a storage area for a passenger to store his/her mobile computer when interfacing with the SCW 200. The seat 106 is located adjacent to the inner sidewall 408.

As described earlier, the SCW 200 includes a video display mount assembly R 206 and a deployment support 208 attached to the video display mount assembly 206. The SCW 200 includes the video display mount assembly 206 that is attached to a first video display 202 and second video display 204. The video display mount assembly 206 is attached to the first video display 202 via a first portion 424 of the video display mount assembly 206 and to the second video display 204 via a second portion 426 of the video display mount assembly 416. The first portion 424 and second portion 426 of the video display mount assembly 206 are attached via a hinge 300. The hinge 300 is configured to allow the video display mount assembly 206 to move between the closed and open positions as described earlier. The first video display 202 includes a first display screen 210 and the second video display 204 includes a second display screen 212.

In this example, the deployment support 208 includes a deployment arm 208 and a post 312. The deployment support 208 is shown attached to the video display mount assembly 206 via deployment arm 308 and a trolley 310 of the video display mount assembly 206. The deployment arm 308 is attached to the post 312 and the post 312 is attached to the inner sidewall 314 (which may be a ledge 440) at a location forward to the seat and extending in a z-direction 442. In this example, the deployment arm 308 has a first end 444 mounted in a rotatable fashion (i.e., attached in a fashion that is rotatable along the post 312) to the post 312 and a second end 446 movable in a plane normal to the z-direction 442. The deployment arm 308 is attached to the video display mount assembly 416 at the second end 446 of the deployment arm 308 via the trolley 438 of the video display mount assembly 206. The trolley 310 is configured to slide along the deployment arm 308 and deployment arm 308 includes a deployment mechanism 448 that couples the rotation of the deployment arm 308 in the plane normal to the z-direction 442 to linear translation of the trolley 310 along the deployment arm 308. In general, the deployment mechanism 448 is configured such that the deployment mechanism 448 is coupled to the deployment arm 308, and translation of the trolley 438 along the deployment arm 308 is coupled to rotation of the deployment arm 308. In this configuration, the video display mounting assembly 206 is carried by the trolley 310 and translated along the deployment arm 308 as the deployment arm 308 is rotated between the stowed and deployed positions.

It is appreciated that the use of the post 312 in the SCW 200 is optional and deployment support 208 may be secured to other vehicle internal structures instead of the ledge 440 such as, for example, a frame or stringer. Moreover, the post 312 may be eliminated from the SCW 200 and the deployment arm 308 may be optionally mounted directly to the inner sidewall 314.

In an example of operation, the video display mount assembly 206 may be placed in the open position when it is deployed in front of a seat 106. In the open position, the video display mount assembly 206 may be fully opened such that the first video display 202 is relatively upright (i.e., approximately parallel with the z-direction 442) and the second video display 204 may be angled downward from the first video display 202 towards the seat 110. Specifically, in this open position, the video display mount assembly 206 is configured to position the first display screen 210 in an approximately vertical position (or in upward tilt adjusted position) and the second display screen 212 at a downward angle position where the downward angle position of the second display screen 212 is at an obtuse angle from the approximate vertical position of the first display screen 210.

In the open position, the position of the video display mount assembly 206 and/or the seat 110 may be adjusted to better suit the needs of a passenger (not shown) sitting in the seat 110. In these examples, the position of the video display mount assembly 206 and/or seat 110 may be adjusted so that the second video display 422, or the combination of keyboard (not shown) and pointing device (not shown), is a convenient position for use as an input device by the passenger (not shown).

In operation, a video cable may be run from a computer (not shown but either the mobile computer of the passenger or a non-passenger provided computer located within the vehicle 102) to at least the first video display 202. If the computer is a non-passenger provided mobile computer, this video cable may be originated from a remote computer in the vehicle and pass through the inner sidewall 314, the post 312, and the deployment arm 308 to the at least first video display 202 in the video display mount assembly 206.

In the closed position, the SCW 200 may be stowed along the upper inner sidewall 410 between the windows 450 and 452 in a curvature 454 of the inner sidewall 314, or within a storage space (not shown) along the inner sidewall 314 within the lower inner sidewall 412 below the ledge 440, that may include a storage space cover door (not shown) along the ledge 440. Utilizing the curvature 454 or storage space within the lower inner sidewall 412 may allow for the first video display 202, second video display 204, or both, to be relatively large displays having diagonal sizes of, for example, 24 inches or larger.

Figure 5A:
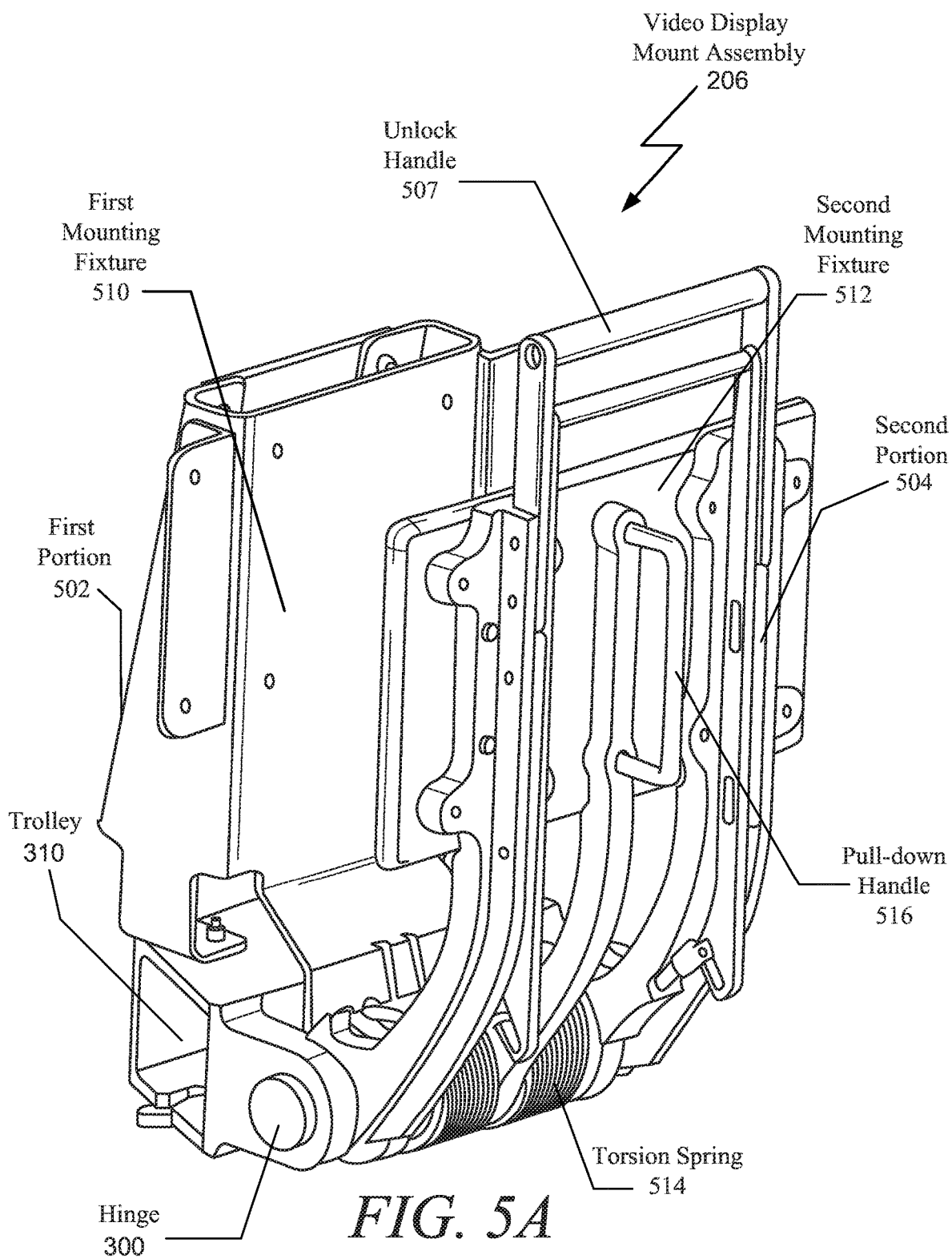
FIG. 5A is a front perspective assembly view of an example of an implementation of the video display mount assembly, described in FIGS. 2, 3, and 4, in accordance with an embodiment of the present invention.

In FIG. 5A, a front perspective assembly view of an example of an implementation of the video display mount assembly 206, described in FIGS. 2, 3, and 4, is shown, in accordance with an embodiment of the present invention. As described earlier, the video display mount assembly 206 may include a first portion 302 of the video display mount assembly 206, a second portion 304 of the video display mount assembly 206, a hinge 300, and trolley 310. The video display mount assembly 206 holds the first video display and second video display in an upper-lower clamshell configuration, as shown in FIGS. 2, 3, and 4. Specifically, the first portion 302 of the video display mount assembly 206 includes a first mounting fixture 510 and the second portion 304 video of the display mount assembly 206 includes a second mounting fixture 512. The first video display is attached to the first mounting fixture 510 and the second video display is attached to the second mounting fixture 512. In this example, the first portion 502 of the video display mount assembly 206 is attached to the trolley 310. The trolley 310 is configured to slide along the deployment arm which is generally in a horizontal position. Since the first portion 502 of the video display mount assembly 206 is attached to the trolley 310 in configuration that is approximately perpendicular to the length of the deployment arm, the combination of the trolley 310 and first mounting fixture 510 will hold the first video display in an approximately vertical position along the z-direction 442 (as shown in FIG. 4). The second portion 504 of the video display mount assembly 206 is attached in a rotatable fashion to the trolley 310 via the hinge 300. The hinge 300 is configured to allow the second video display, attached to the second mounting fixture 512, to move between the closed position and open position of the video display mount assembly 206.

As described earlier, in the closed position the second video display will be face-to-face with the first video display, while in the open position, the second video display will angled downward away from the first video display.

The video display mount assembly 206 may also include a torsion spring 514 that is in-line with the hinge 300, a unlock handle 507 and a pull-down handle 516 attached to the second portion 304 of the video display mount assembly 206. The unlock handle 507 allows the passenger to unlock the second mounting fixture 512 at the hinge 300 so the passenger can use the pull-down handle 516 to either open or close the video display mount assembly 206 into the opened or closed position, respectively, by correspondingly pulling or pushing on the pull-down handle 516. Once the second portion 504 of the video display mount assembly has traveled angle 306, the unlock handle 507 locks the angle 306 at the hinge 300. To return the second portion 504 of the video display mount assembly to the closed position, the unlock handle 507 is operated by the passenger and the second portion 504 of the video display assembly is raised by correspondingly pushing on the pull-down handle 516. In this example, the torsion spring 514 may assist with raising the second video display into the closed position, and it prevents the second video display from falling into the open position from the closed position.

Figure 5B:
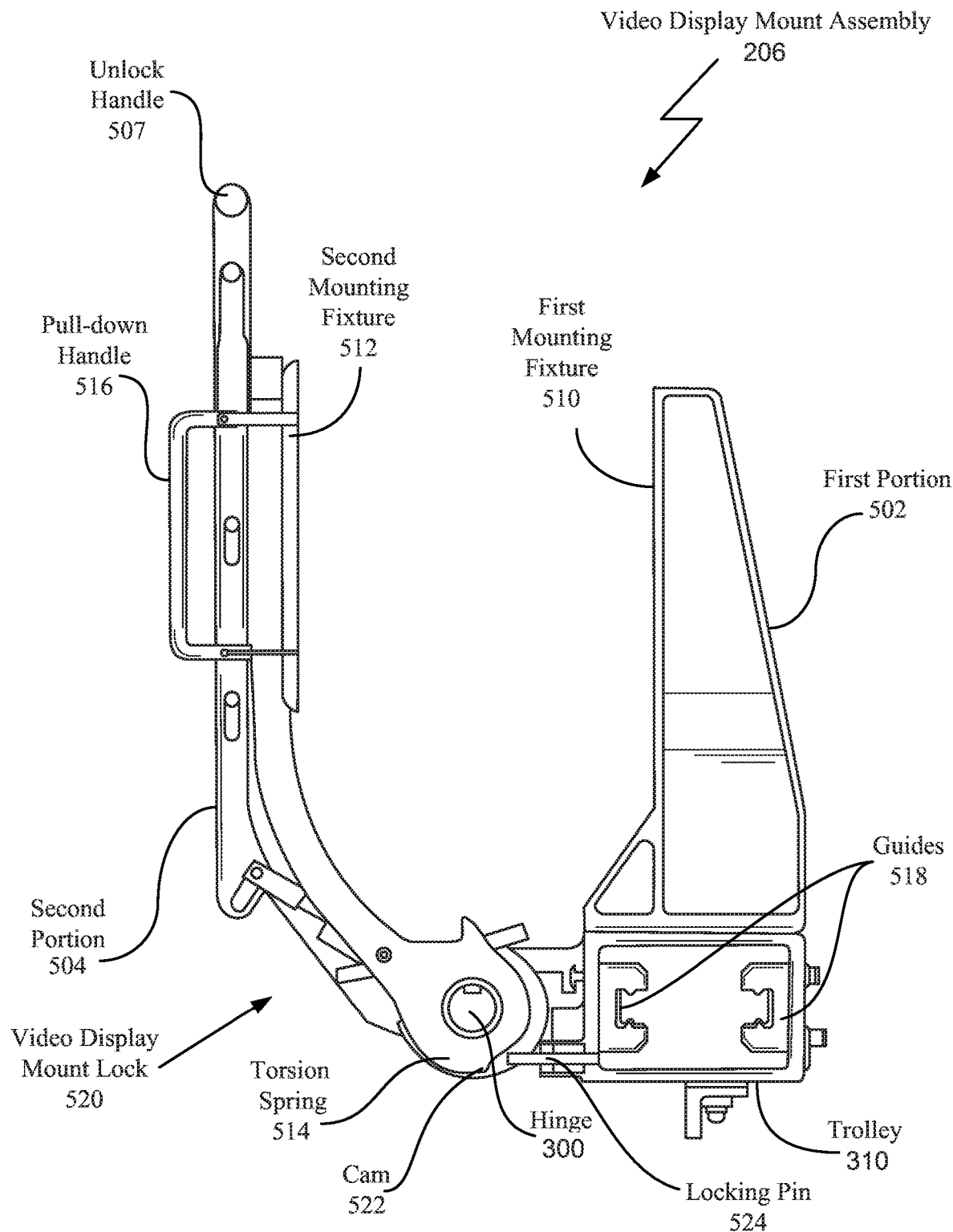
FIG. 5B is a side assembly view of the video display mount assembly described in FIG. 5A in accordance with an embodiment of the present invention.

In FIG. 5B, a side assembly view of the video display mount assembly 206 described in FIG. 5A is shown in accordance with an embodiment of the present invention. In this side view, the trolley 310 is shown to include a pair of linear slides or guides 518 configured to interact with rails on sides of a deployment arm (not shown). In this example, the video display mount assembly 206 may include a video display mount lock 520 that prevents the video display mount assembly 206 from opening until it has reached a specific position along the deployment arm (not shown). The video display mount lock 520 may be located at the hinged end of the second mounting fixture 512. The video display mount lock 520 includes a cam 522 at the hinged end of the second mounting fixture 512. The video display mount lock 520 also includes a locking pin 524 having a first end that extends through a hole in the trolley 310 and a second end that is biased against the cam 522. The cam 522 is configured to push the locking pin 524 through an opening in the deployment arm (not shown) when the hole in the trolley 310 is aligned with the opening in the deployment arm (not shown).

Figure 6:
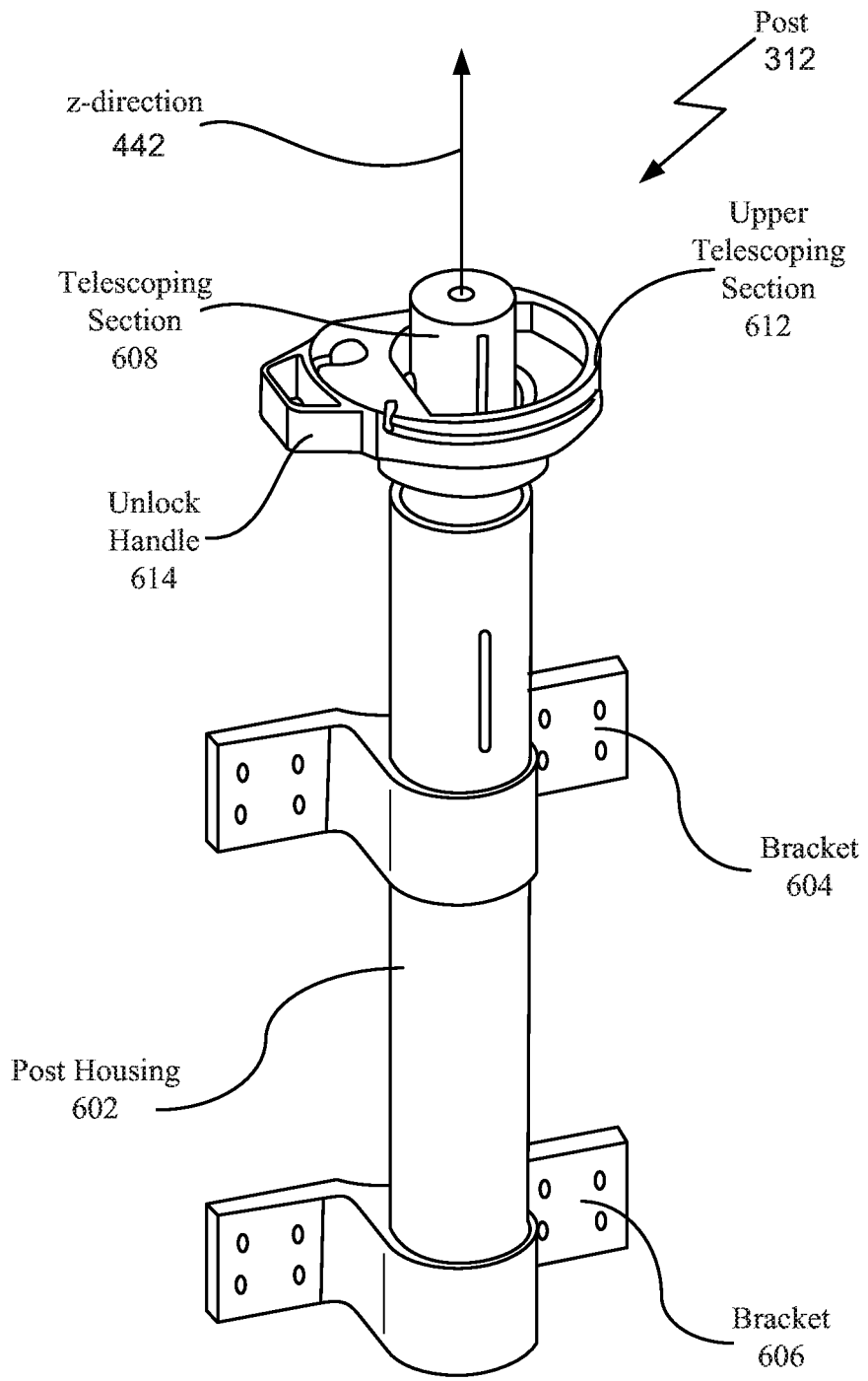
FIG. 6 is a side view of an example of an implementation of a support post, described in FIGS. 3 and 4, in accordance with an embodiment of the present invention.

In FIG. 6, a side view of an example of an implementation of a post 312, described in FIGS. 3 and 4, is shown in accordance with an embodiment of the present invention. The post 312 may include a post housing 602 and brackets 604 and 606 for securing the post housing 602 to the inner sidewall or supporting structure. The post housing 602 may include telescoping section 608 mounted for rotation within the post housing 602. The telescoping section 608 may extend in the z-direction 442 (i.e., the z-axis), which is along the axial direction of the post 312. In this example, the individual telescoping sections within the telescoping section 608 may be locked to keep it from rotating. A mechanism (not shown—such as, for example, a hydraulic lift cylinder) may be utilized to extend and retract the telescoping section 608. The z-direction 442 adjustment enables the height of the video display mount assembly to be adjusted as needed.

In this example, the telescoping section 608 is locked for rotation about the z-direction 442 and an upper portion 612 of the telescoping section 608 may include a coupling mechanism to affix the deployment arm to the upper section of the telescoping section 612 of the post 312. A unlock handle 614 may be provided for the passenger to secure the position of the deployment arm 312 in a stowed or deployed position about the z-direction 442.

Figure 7A:
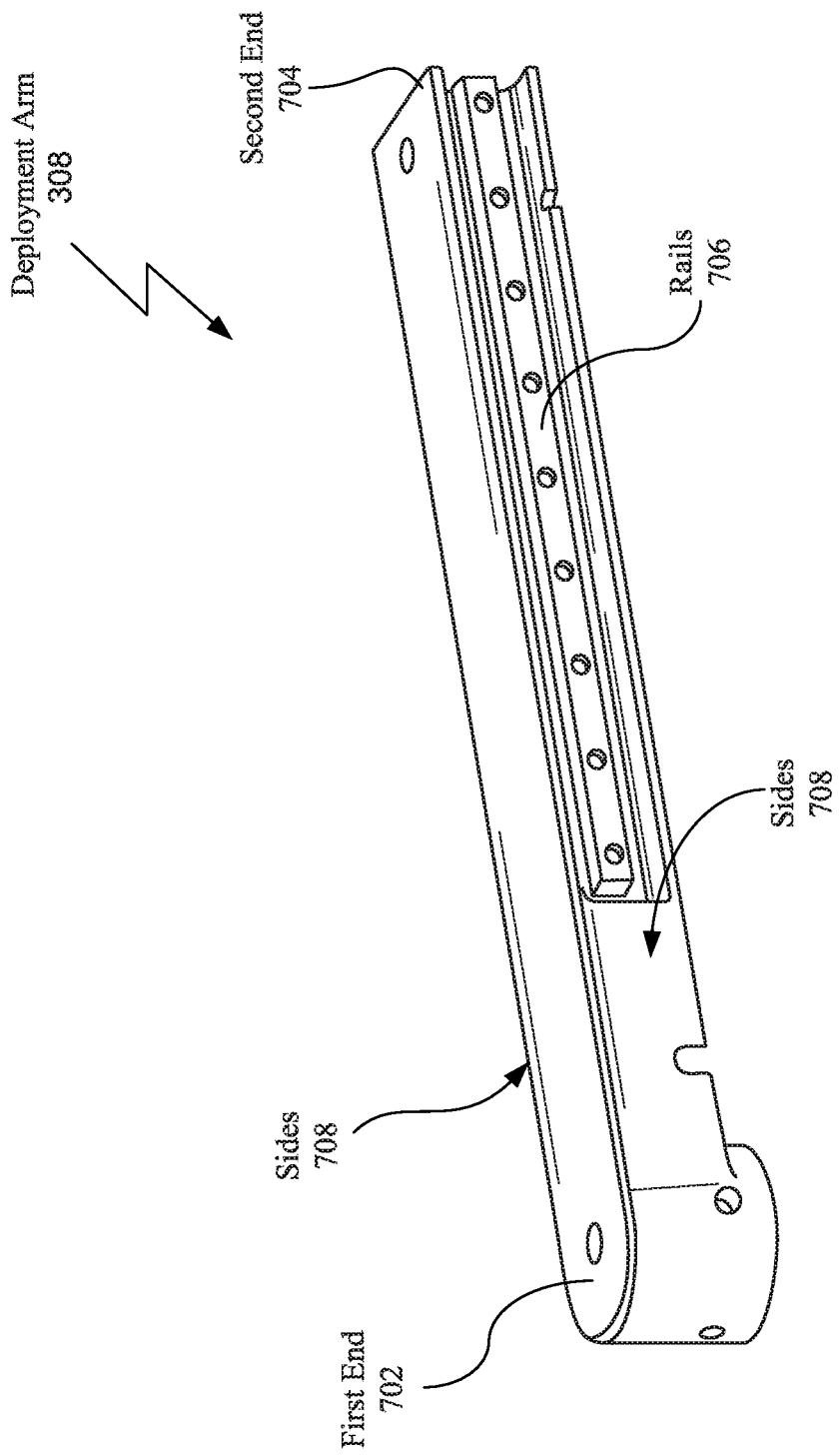
FIG. 7A is a perspective side view of an example of an implementation of the deployment arm, described in FIGS. 2 through 6, in accordance with an embodiment of the present invention.

Turning to FIG. 7A, a perspective side view of an example of an implementation of the deployment arm 308, described in FIGS. 2 through 6, is shown in accordance with an embodiment of the present invention. The deployment arm 308 includes a first end 702 (also referred to as the fixed end) for attaching the deployment arm 308 to the upper telescoping section 612 (shown in FIG. 6). When the deployment arm 308 is attached to the upper telescoping section 612 of the post 600, the deployment arm 308 is configured to move within a plane that is normal to the z-direction 442. It is appreciated that the rotation range of the upper telescoping section 612 and, therefore, the rotation range of the deployment arm 308 may be limited to a predetermined fixed range. For example, the range of rotation may be limited between a stowed position, in which the deployment arm 308 is parallel to the inner sidewall, and a deployed position in which the deployment arm 308 is approximately normal to the inner sidewall.

The deployment arm 308 may include a second end 704 (also referred to as a free end) at the opposite end of the length of the deployment arm 308 and deployment arm rails 706 attached to the sides 708 of the deployment arm 308 along a partial portion of the length of the deployment arm 308. In this example, the deployment arm rails 706 are configured to guide the trolley 508 (shown in FIGS. 5A and 5B) as the trolley 508 slides along the deployment arm 308. The guides 518 (shown in FIG. 5B) configured to mate with the deployment arm rails 706.

Figure 7B:
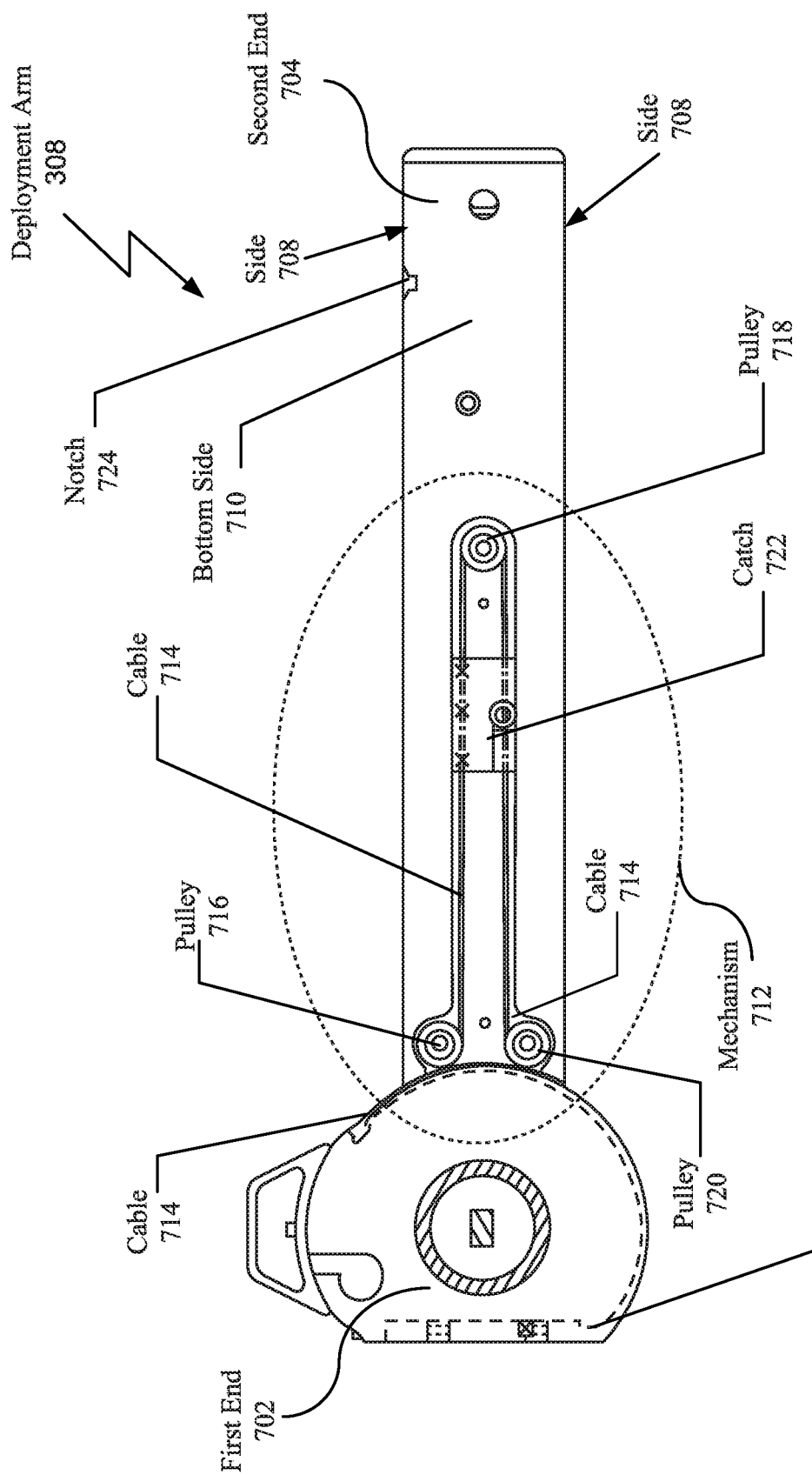
FIG. 7B is a bottom view of the deployment arm described in FIG. 7A in accordance with an embodiment of the present invention.

Turning to FIG. 7B, a bottom view of the deployment arm 308 described in FIG. 7A is shown in accordance with an embodiment of the present invention. In this view, attached to the bottom side 710 of the deployment arm 308 is shown a deployment arm mechanism 712. The deployment arm mechanism 712 is configured for coupling the rotation of the deployment arm 308 to the translation of the trolley 310 along the deployment arm 308. The deployment arm mechanism 712 enables the video display mount assembly 500 to be translated along the deployment arm 308 as the deployment arm 308 is being rotated between the stowed and deployed positions. As the deployment arm 308 is rotated towards the deployed position, the video display mount assembly 206 is translated towards the free end 704 of the deployment arm 308. As the deployment arm 308 is rotated towards the stowed position, the video display mount assembly 206 is translated towards the fixed end 702 of the deployment arm 308. Such coupling of the rotation and the translation allows the video display mount assembly 206 to be stowed and deployed with minimal manual input.

It is appreciated by those of ordinary skill in the art that the deployment arm mechanism 712 for coupling the rotation of the deployment arm 308 to the translation of the video display mount assembly 206 is not limited to any particular design. In this example, the deployment arm mechanism 712 may be attached to an underside (i.e., the bottom side 710) of the deployment arm 308. A cable 714 winds around a series of pulleys 716, 718, and 720 mounted to the deployment arm 308. The ends of the cable 714 are fixed to a non-rotatable portion of the post 312. During operation, the cable 714 remains fixed at each end and does not travel. When the deployment arm 308 is rotated, the cable 714 is pulled in line with the deployment arm 308 and the pulleys 716, 718, and 720 roll along the cable 714.

A catch 722 is attached to cable 714 and engages the trolley 310 such that the trolley 310 is fixed to a stationary point on the cable 714. The trolley 310 "moves" relative to the deployment arm 308 and appears to be moving up or down the length of the deployment arm 308. As the deployment arm 308 is rotated counterclockwise towards the stowed position, the video display mount assembly 206 is moved towards the fixed end 702 of the deployment arm 308. As the deployment arm 308 is rotated clockwise towards the deployed position, the video display mount assembly 206 is moved towards the free end 704 of the deployment arm 308. The video display mount assembly 206 stops when a notch 724 lines up with the hole in the trolley 310 and the cam 522 pushes the locking pin 524 through the hole in trolley 310 and into the notch 724.

Figure 8:
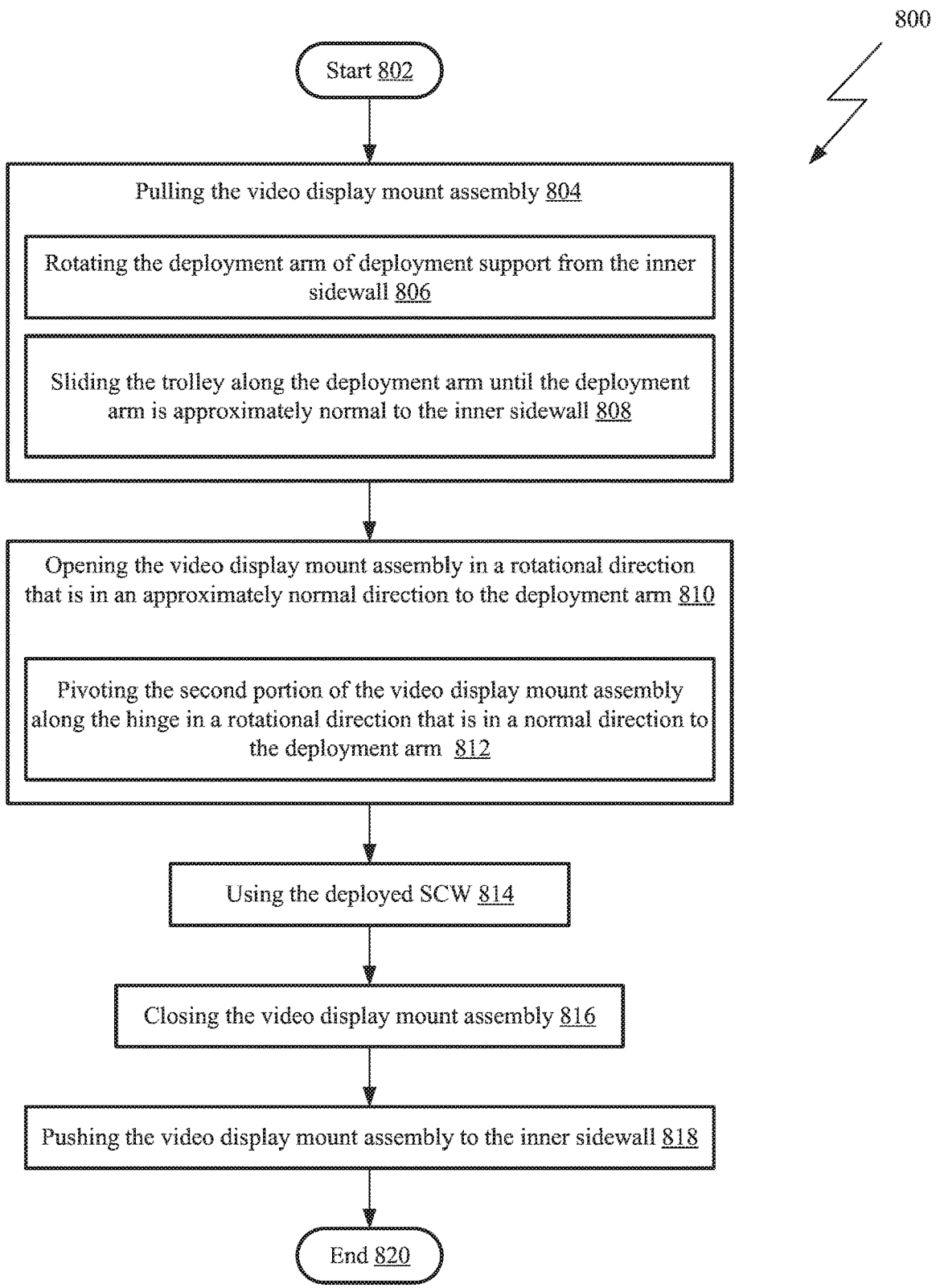
FIG. 8 is a flowchart of an example of an implementation of a process utilizing the SCW in accordance with an embodiment of the present invention.

Reference is now made to FIGS. 8 and 9A-9D, which illustrate the ease of moving the video display mount assembly 206 between the stowed and deployed positions. FIG. 8 is a flowchart 800 showing the steps preformed in an example of a process of deploying and stowing the video mount assembly 206.

The process starts 802 in step 804 by pulling the video display mount assembly 206 from the inner sidewall 408 by a user. The step of 804 of pulling the video display mount assembly 500 from the inner sidewall 314 includes the sub-step 806 of rotating the deployment arm 434 from the inner sidewall 314 to the deployed position in front of the seat 110, which is approximately in the normal direction to the inner sidewall 314. Additionally, step 804 also includes the sub-step 808 of sliding the trolley 310 along the deployment arm 308 until the deployment arm 308 is approximately normal to the inner sidewall 314. Since the sliding of the trolley 310 is coupled to the rotational motion of the deployment arm 308 by the deployment mechanism 712, both sub-steps 806 and 808 happen at the same time that step 804 is performed. Once the deployment arm 310 is at the deployed position, the user may then, in step 810, pull on the pull-down handle 516 of the second portion 504 to open the video display mounting assembly 206 in a rotational direction that is in a direction that is approximately normal to the deployment arm 308. In this example, the opening step 810 includes the sub-step 812 of pivoting the second portion 504 along the hinge in a rotational direction that is in a normal direction to the deployment arm 308.

Once deployed, the user may utilize the SCW, in step 814, and when finished may close the video display mounting assembly, in step 816, so that the video display mounting assembly is a closed clamshell configuration. The user may then, in step 818, push the video display mount assembly back to the inner sidewall 314, where the movement of the trolley 310 and deployment arm 308 will be in the opposite direction from the movement described in step 804. The process then ends 820.

FIG. 9A shows the video display mount assembly 206 in a stowed position in the curvature of the inner sidewall 314. The deployment arm 700 is parallel to the sidewall 314, between the inner sidewall 314 and the video display mount assembly 206.

In general, the video display mount assembly 206 is moved from the stowed position to the deployed position simply by pulling the video display mount assembly 206 away from the inner sidewall 314. As shown in FIGS. 9B and 9C, as the video display mount assembly 206 is pulled away from the inner sidewall 314 the deployment arm 308 swings out, which causes the video display mount assembly 206 to slide towards the free end of the deployment arm 308. The video display mount assembly 206 also rotates with the deployment arm 700 until it is facing the seat 902. The video display mount assembly 206 may then be manually slid further down the deployment arm 308 to adjust its position in front of the seat 110 (FIG. 9D).

Once in front of the seat 110, the video display mount assembly 206 is opened, whereby the second video display is lowered. Further adjustments may be made to place the second video display in a comfortable position. For instance, vertical height may be adjusted via the post 312, and the position of the seat 110 may be moved forward or back.

The computer is then used. Both video displays display video from the computer. If the lower display is a touch-screen display, it is also used to provide inputs to the computer.

After the computer has been used, the video display mount assembly 206 is closed. The second video display is raised until its screen is face-to-face with the screen of the first video display. The torsion spring reduces the force needed to raise the second video display.

The video display mount assembly 206 is then pushed towards the inner sidewall 314. As the deployment arm 308 is moved towards the stowed position, the video display mount assembly 206 rotates with the deployment arm 308 and slides toward the fixed end 522 of the deployment arm 308. When the deployment arm 308 is returned to the stowed position, the video display mount assembly 206 is positioned against the inner sidewall 314.

An operator doesn't have to spend time manipulating the video display mount assembly 206. Although attached rotation is not required for a workstation herein, it does offer advantages. If the attached rotation was absent, the operator would likely have to rotate and slide the video display mount assembly 206 in a few attempts to get a large display to be tightly stowed against the inner sidewall 314. Thus, the attached rotation enables a larger video display to be used.

A video display mount assembly for the SCW is not limited to dual video displays in a clamshell configuration. Other arrangements for collapsing the dual video displays may be used. For instance, the video display mount assembly may be configured to close by sliding the second video display into a face-to-face position over the first video display.

The SCW is not limited to a video display mount assembly having video displays. Some configurations of the SCW herein may include a single video display in combination with the video display mount assembly. However, dual video displays in a clamshell configuration take up little more space than a single video display, yet provide greater viewing area.

It will be understood that various aspects or details of the invention may be changed without departing from the scope of the invention. It is not exhaustive and does not limit the claimed inventions to the precise form disclosed. Furthermore, the foregoing description is for the purpose of illustration only, and not for the purpose of limitation. Modifications and variations are possible in light of the above description or may be acquired from practicing the invention. The claims and their equivalents define the scope of the invention.

What is claimed is:

1. A stowable computer workstation ("SCW") for a workplace, wherein the workplace includes an inner sidewall and a seat, the SCW comprising:
 a deployment arm configured to securely attach to the inner sidewall at a location forward to the seat, wherein the deployment arm has a first end rotatably coupled to the inner sidewall and a second end that is rotatable in a plane normal to the inner sidewall, wherein the deployment arm includes a track between the first end and the second end;
 a trolley moveably attached to the deployment arm, wherein the deployment arm includes a deployment mechanism for coupling a rotational direction of the deployment arm to a linear translation of the trolley along the track of the deployment arm; and
 a video display mount assembly attached to the trolley, wherein the deployment arm is configured to deploy the video display mount assembly in front of the seat when in a deployed position and to stow the video display mount assembly against the inner sidewall when in a stowed position.

2. The SCW of claim 1, wherein the deployment mechanism is configured to slide the trolley along the deployment arm when the deployment arm is rotating such that the video display mounting assembly is translated along the deployment arm as the deployment arm is rotated between the stowed position and the deployed position.

3. The SCW of claim 2, wherein the video display mount assembly includes a first mounting fixture and a second mounting fixture in a clamshell configuration, wherein a first video display is attached to the first mounting fixture, and wherein an input device or a second video display is attached to the second mounting fixture.

4. The SCW of claim 3, wherein the second video display is attached to the second mounting fixture, wherein the first video display includes a first display screen and the second video display includes a second display screen, wherein the first mounting fixture and second mounting fixture of the video display mount assembly are configured to position the first display screen and the second display screen in an adjacent face-to-face position when the video display mount assembly is positioned in a closed position, wherein the first mounting fixture and second mounting fixture of the video display mount assembly is configured to position the first display screen in an approximately vertical position and the second display screen at a downward angle position when the video display mount assembly is positioned in an open position, and wherein the downward angle position of the second display screen is at an obtuse angle from the approximately vertical position of the first display screen.

5. The SCW of claim 4, wherein the deployment mechanism includes a plurality of pulleys mounted to an underside of the deployment arm, a cable wound around the pulleys, ends of the cable secured to a non-rotatable portion of the inner sidewall, and the trolley secured to a point on the cable, and wherein the video display mount assembly includes a first portion of the video display mount assembly that includes an end of the first portion attached to the trolley, a cam, and a locking pin, and wherein the cam is configured to push the locking pin through a hole in the trolley and to engage an opening in the deployment arm when the hole in the trolley and opening in the deployment arm are aligned.

6. The SCW of claim 5, wherein the non-rotatable portion of the inner sidewall is a post.

7. The SCW of claim 5, wherein the first and the second video displays are flat panel video displays.

8. The SCW of claim 5, wherein the second video display is a touch screen display corresponding to the input device.

9. The SCW of claim 3, wherein the video display mount assembly includes the first video display attached to the first mounting fixture and a flat shelf attached to the second mounting fixture.

10. The SCW of claim 2, wherein the video display mount assembly includes:
 a first portion having a first mounting fixture attached to the trolley, wherein the first mounting fixture is configured to attach to a first video display; and
 a second portion having a second mounting fixture, and a hinge, wherein the second portion is rotatably coupled to the hinge.

11. The SCW of claim 1, wherein the inner sidewall includes a curvature and the video display mount assembly is configured to be stowed against the inner sidewall in the curvature of the inner sidewall.

12. The SCW of claim 1, wherein the inner sidewall includes a storage space and the video display mount assembly is configured to be stowed against the inner sidewall within the storage space in the inner sidewall.

13. The SCW of claim 1, wherein the deployment mechanism includes a plurality of pulleys mounted to an underside of the deployment arm, a cable wound around the pulleys, ends of the cable secured to a non-rotatable portion of the inner sidewall, and the trolley secured to a point on the cable.

14. The SCW of claim 13, wherein the non-rotatable portion of the inner sidewall is a post.

15. A method for deploying a stowable computer workstation ("SCW") within a workplace, wherein the workplace includes an inner sidewall and a seat, and the SCW has a deployment arm securely attached and rotatably coupled to the inner sidewall at a location forward to the seat, a trolley moveably attached to the deployment arm, and a video display mount assembly attached to the trolley, the deployment arm having a first end rotatably coupled to the inner sidewall, the method comprising:
 pulling the video display mount assembly from a stowed position against the inner sidewall to a deployed position in front of the seat;
 rotating a second end of the deployment arm from the inner sidewall in a rotational direction in a plane normal to the inner sidewall, the deployment arm including a track between the first end and the second end; and
 sliding the trolley with a translation motion along the track of the deployment arm using a deployment mechanism that couples the rotating of the deployment arm to the translation motion of the trolley along the deployment arm.

16. The method of claim 15, wherein rotating the deployment arm includes pivoting the deployment arm in a rotational direction away from the inner sidewall along a pivot point until the deployment arm is approximately normal to the inner sidewall, and wherein sliding the trolley includes moving the trolley in a linear translation along the deployment arm that is coupled to the rotating of the deployment arm.

17. The method of claim 16 wherein rotating the deployment arm and the sliding of the trolley happen at the same time the video display mount assembly is pulled from the stowed position against the inner sidewall.

18. The method of claim 17, wherein opening the video display mount assembly includes pivoting a portion of the video display mount assembly along a hinge in a rotational direction that is in a direction normal to the deployment arm.

19. The method of claim 18, wherein pivoting the second portion of the video display mount assembly along the hinge includes pivoting the portion of the video display mount assembly from a closed position to an open position.

20. The method of claim 19, wherein sliding the trolley includes locking the trolley at a position that is approximately at an end of the deployment arm.

21. The method of claim 15, wherein sliding the trolley along the deployment arm using the deployment mechanism includes utilizing a plurality of pulleys mounted to an underside of the deployment arm and a cable, wherein the cable includes ends of the cable secured to a non-rotatable portion of the inner sidewall, and wherein the trolley is secured to the cable.

\* \* \* \* \*

UNITED STATES PATENT AND TRADEMARK OFFICE
CERTIFICATE OF CORRECTION

PATENT NO. : 10,640,054 B2
APPLICATION NO. : 15/954592
DATED : May 5, 2020
INVENTOR(S) : Brian Gregory Fischer et al.

Page 1 of 1

It is certified that error appears in the above-identified patent and that said Letters Patent is hereby corrected as shown below:

In the Claims

Claim 15, Column 14, Line 41, change:
"deployment arm securely attached and rotatably coupled to"

To read:
--deployment arm securely attached to--

Claim 19, Column 15, Line 9, change:
"19. The method of claim 18, wherein pivoting the second"

To read:
--19. The method of claim 18, wherein pivoting the--

Signed and Sealed this
Twenty-first Day of July, 2020

Andrei Iancu
*Director of the United States Patent and Trademark Office*